(12) United States Patent
Hu (10) Patent No.: US 8,006,405 B2
(45) Date of Patent: Aug. 30, 2011

(54) CALIPER

(76) Inventor: Bobby Hu, Taichung (TW)

(*) Notice: Subject to any disclaimer, the term of this patent is extended or adjusted under 35 U.S.C. 154(b) by 202 days.

(21) Appl. No.: 12/486,001

(22) Filed: Jun. 17, 2009

(65) Prior Publication Data

US 2010/0186250 A1   Jul. 29, 2010

(30) Foreign Application Priority Data

Jan. 23, 2009   (TW) .............................. 98102871 A (51) Int. Cl.
*G01B 3/16*   (2006.01)
*G01B 5/02*   (2006.01)

(52) U.S. Cl. ......................................... 33/679.1; 33/807

(58) Field of Classification Search ............... 33/501.08, 33/501.5, 558.01, 558.04, 679.1, 783, 795, 33/796, 797, 806, 807, 808
See application file for complete search history.

(56) References Cited

U.S. PATENT DOCUMENTS

| | | | | |
|---|---|---|---|---|
| 2,236,443 A | * | 3/1941 | Oboler | 33/555.3 |
| 2,640,273 A | * | 6/1953 | Larson et al. | 33/555.1 |
| 2,979,825 A | * | 4/1961 | Westbrook | 33/679.1 |
| 4,138,820 A | * | 2/1979 | O'Connor | 33/562 |
| 4,635,370 A | * | 1/1987 | Beaver | 33/558.01 |
| 4,745,685 A | * | 5/1988 | Castillo | 33/199 R |
| 4,843,721 A | * | 7/1989 | Hoge | 33/802 |
| 5,070,623 A | * | 12/1991 | Barnes | 33/807 |
| 5,548,903 A | * | 8/1996 | Johnson et al. | 33/810 |
| 5,875,558 A | * | 3/1999 | Bakke et al. | 33/501.45 |
| 7,509,754 B2 | | 3/2009 | Hu | |
| 7,752,770 B2 | * | 7/2010 | Molmann | 33/679.1 |
| 2007/0157484 A1 | * | 7/2007 | Grubler | 33/679.1 |

FOREIGN PATENT DOCUMENTS

| EP | 2211136 A1 | * | 7/2010 |
|---|---|---|---|
| GB | 104839 A | * | 3/1917 |

* cited by examiner

*Primary Examiner* — R. A. Smith
(74) *Attorney, Agent, or Firm* — Alan Kamrath; Kamrath & Associates PA (57) ABSTRACT

A caliper includes two legs pivotably connected together at first ends thereof. Second ends of the legs can abut opposite first and second sides of an object to be gauged. Each leg includes first and second faces extending between the first and second ends. A scale is formed on the first surface of each leg. Each leg further includes an inclined surface between the first and second faces. The size of the object is indicated by an intersection of the scales. The inclined surfaces of the legs abut third and fourth faces of the object so that the gauging result is reliable.

7 Claims, 9 Drawing Sheets

CALIPER

BACKGROUND OF THE INVENTION

1. Field of the Invention

The present invention relates to a caliper and, more particularly, to a caliper for rapidly gauging the size of a nut, bolt head, or the like.

Gauging of objects such as nuts, bolts, or the like is always a troublesome task for non-professional users during assembly or maintenance. Imperial and metric systems of the sizes of the objects further confuse the user. U.S. Pat. No. 7,509,754 discloses a caliper including two legs pivotably connected together at first ends thereof. Two abutting portions are respectively formed on second ends of the legs. Two slots are respectively defined in the legs and between the first and second ends. An indicator is slideably received in the slots. The indicator is slideable along the slots to move the abutting portions toward each other until the abutting portions respectively abut two opposite sides of an object to be gauged. The size of the object is indicated by an indicating portion of the indicator that points to a scale on one of the legs. Although the caliper is precise, the costs of material and processing are high.

Thus, a need exists for a caliper allowing rapid measurement of objects while having a simplified structure to reduce the costs for material and processing.

SUMMARY OF THE INVENTION

The present invention solves this need and other problems in the field of reduction in costs of calipers by providing, in a preferred form, a caliper including a first leg having first and second ends spaced along a first longitudinal axis. The first leg further includes first and second faces extending between the first and second ends of the first leg. The first and second faces are spaced from each other in a thickness direction perpendicular to the first longitudinal axis. The first face of the first leg includes a first scale intermediate the first and second ends of the first leg along the first longitudinal axis. The first leg further includes a first inclined surface extending between the first and second faces of the first leg in the thickness direction. The first inclined surface is at a first acute angle with the first longitudinal axis. The first inclined surface is intermediate the second end of the first leg and the first scale along the first longitudinal axis. A second leg includes first and second ends spaced along a second longitudinal axis perpendicular to the thickness direction. The first end of the second leg is pivotably connected to the first end of the first leg. The second leg further includes first and second faces extending between the first and second ends of the second leg. The first and second faces of the second leg are spaced from each other in the thickness direction. The first face of the second leg includes a second scale intermediate the first and second ends of the second leg along the second longitudinal axis. The second leg further includes a second inclined surface extending between the first and second faces of the second leg. The second inclined surface is at a second acute angle with the second longitudinal axis. The second inclined surface is intermediate the second end of the second leg and the second scale along the second longitudinal axis.

The second ends of the first and second legs are adapted to abut opposite first and second sides of an object to be gauged by the caliper. The object further includes third and fourth sides intermediate the first and second sides. A size of the object is indicated by an intersection of the first and second scales. The first and second inclined surfaces of the first and second legs are adapted to abut the third and fourth sides of the object to provide a reliable gauging result.

In preferred forms, the second end of each of the first and second legs includes a protrusion. The protrusions of the first and second legs are spaced from each other and abut the first and second sides of the object. A third scale is formed on the second face of the first leg, and a fourth scale is formed on the second face of the second leg. The first scale has a measuring unit the same as that of the second scale. The third scale has a measuring unit the same as that of the fourth scale but different from that of the first scale. The size of the object can be indicated by an intersection of the third and fourth scales.

In a preferred form, the first face of the first leg has a first inner edge on which the first scale is formed. The first face of the second leg has a second inner edge on which the second scale is formed. The first inner edge has a color different from that of the first face of the first leg to allow easy reading of the size of the object.

The present invention will become clearer in light of the following detailed description of an illustrative embodiment of this invention described in connection with the drawings.

BRIEF DESCRIPTION OF THE DRAWINGS

The illustrative embodiment may best be described by reference to the accompanying drawings where.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "third", "fourth", "inner", "end", "portion", "longitudinal", "thickness", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

A caliper according to the preferred teachings of the present invention is shown in the drawings and generally designated 10. The caliper 10 can be utilized to rapidly gauge the size of an object 20 such as a nut, bolt head, or the like.

In preferred forms shown in FIGS. 1-9, caliper 10 includes a first leg 11 and a second leg 12. First leg 11 includes first and second faces 116 and 118 spaced in a thickness direction. First leg 11 further includes a first end 110 serving as a pivotal portion 13 and having a pivot hole 14 extending from first face 116 through second face 118 of first leg 11. First leg 11 further includes a second end 111 spaced from first end 110 of first leg 11 along a first longitudinal axis perpendicular to the thickness direction. Second end 111 of first leg 11 has a protrusion 117. First leg 11 further includes an inclined surface 114 extending between first and second faces 116 and 118 of first leg 11 and at a first acute angle with the first longitudinal axis. A scale 113 is formed on an inner edge 115 of first face 116 of first leg 11 and has a plurality of marks and graduated figures in metric measuring units. Inclined surface 114 of first leg 11 is intermediate protrusion 117 and scale 113 of first leg 11 along the first longitudinal axis. A scale 119 is formed on an inner edge 115 of second face 118 of first leg 11 and has a plurality of marks and graduated figures in Imperial measuring units. Inclined surface 114 of first leg 11 is intermediate protrusion 117 and scale 119 of first leg 11 along the first longitudinal axis. In the preferred forms shown in FIGS. 7 and 8, inner edge 115 has a color different from that of first face 116 of first leg 11.

In preferred forms shown in FIGS. 1-9, second leg 12 includes a first face 126 facing away from first leg 11 and a second face 128 facing first leg 11. First and second faces 126 and 128 of second leg 12 are spaced from each other in the thickness direction. Second leg 12 further includes a first end 120 serving as a pivotal portion 13 and having a pivot hole 14 extending from first face 126 through second face 128 of second leg 12. A rivet 131 is extended through pivot holes 14 of first and second legs 11 and 12 to allow relative pivotal movement therebetween. <A wave-shaped washer 132 is mounted around rivet 131 and sandwiched between an enlarged section 133 of rivet 131 and first end 120 of second leg 12. Other pivotal connections between first and second legs 11 and 12 would be within the skill of the art. Second leg 12 further includes a second end 121 spaced from first end 120 of second leg 12 along a second longitudinal axis perpendicular to the thickness direction. Second end 121 of second leg 12 has a protrusion 127. Protrusion 127 of second leg 12 faces protrusion 117 of first leg 11 and is of a shape symmetric to protrusion 117. Second end 121 of second leg 12 further includes an inclined surface 124 extending between first and second faces 126 and 128 of second leg 12 and at a second acute angle with the second longitudinal axis. The first acute angle is equal to the second acute angle in the preferred forms shown in FIGS. 1-9. A scale 123 is formed on an inner edge 125 of first face 126 of second leg 12 and has a plurality of marks and graduated figures in metric measuring units. The graduated figures of one of scales 113 and 123 are different from those of the other scale 113, 123. Inclined face 124 of second leg 12 is intermediate protrusion 127 and scale 123 of second leg 12 along the second longitudinal axis. A scale 129 is formed on an inner edge 125 of second face 128 of second leg 12 and has a plurality of marks and graduated figures in Imperial measuring units. Inclined face 124 of second leg 12 is intermediate protrusion 127 and scale 129 of second leg 12 along the second longitudinal axis. The graduated figures of one of scales 119 and 129 are different from those of the other scale 119, 129.

In the preferred forms shown in FIGS. 1-9, first leg 11 includes a bend 112 intermediate second end 111 of first leg 11 and scale 113 along the first longitudinal axis. Second leg 12 includes a bend 122 intermediate second end 121 of second leg 12 and scale 123 along the second longitudinal axis. Bends 112 and 122 are so configured that protrusions 117 and 127 are spaced from and substantially parallel to each other.

Figure 1:
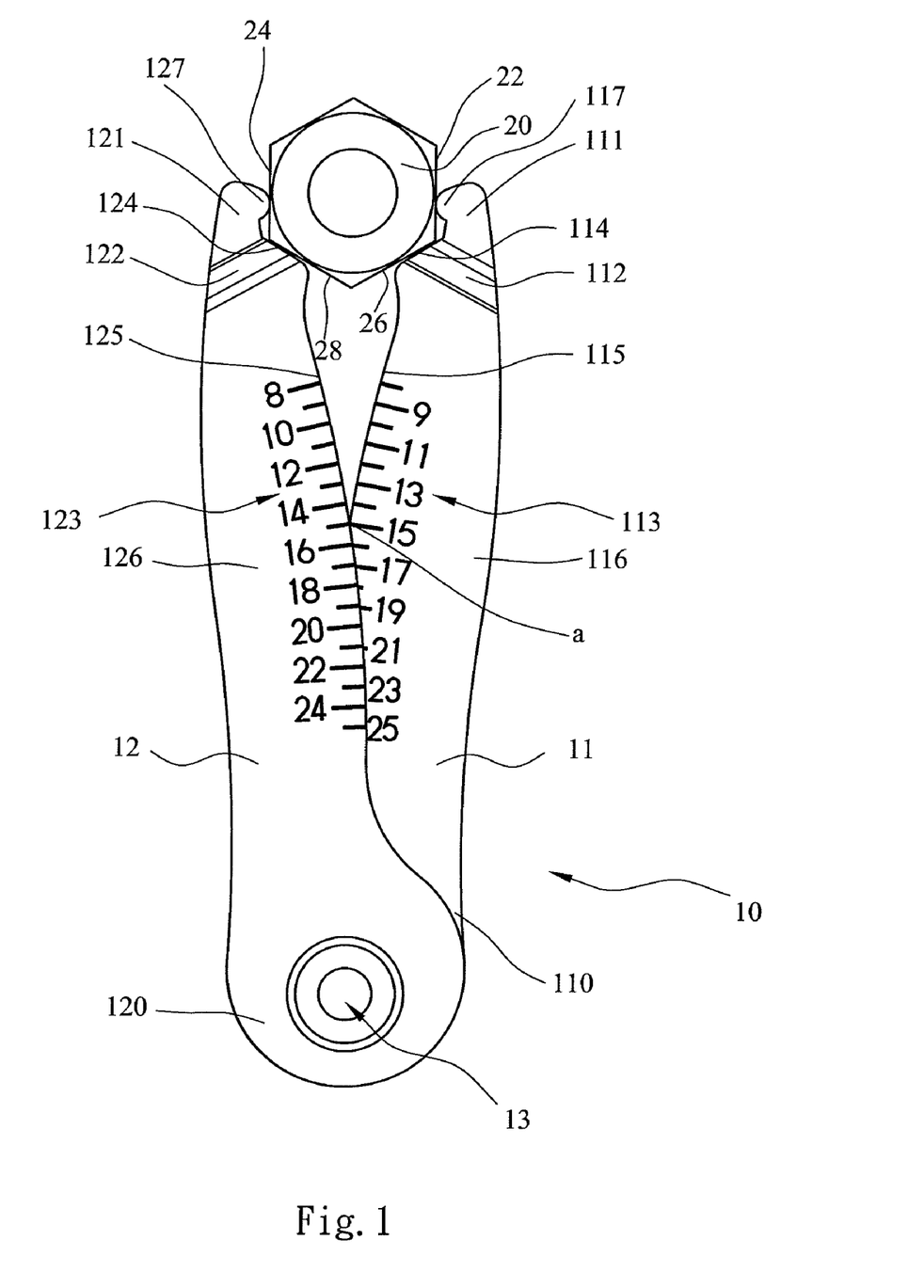
FIG. 1 shows a front elevational view of a caliper of an embodiment according to the preferred teachings of the present invention and an object being gauged by the caliper.
Figure 2:
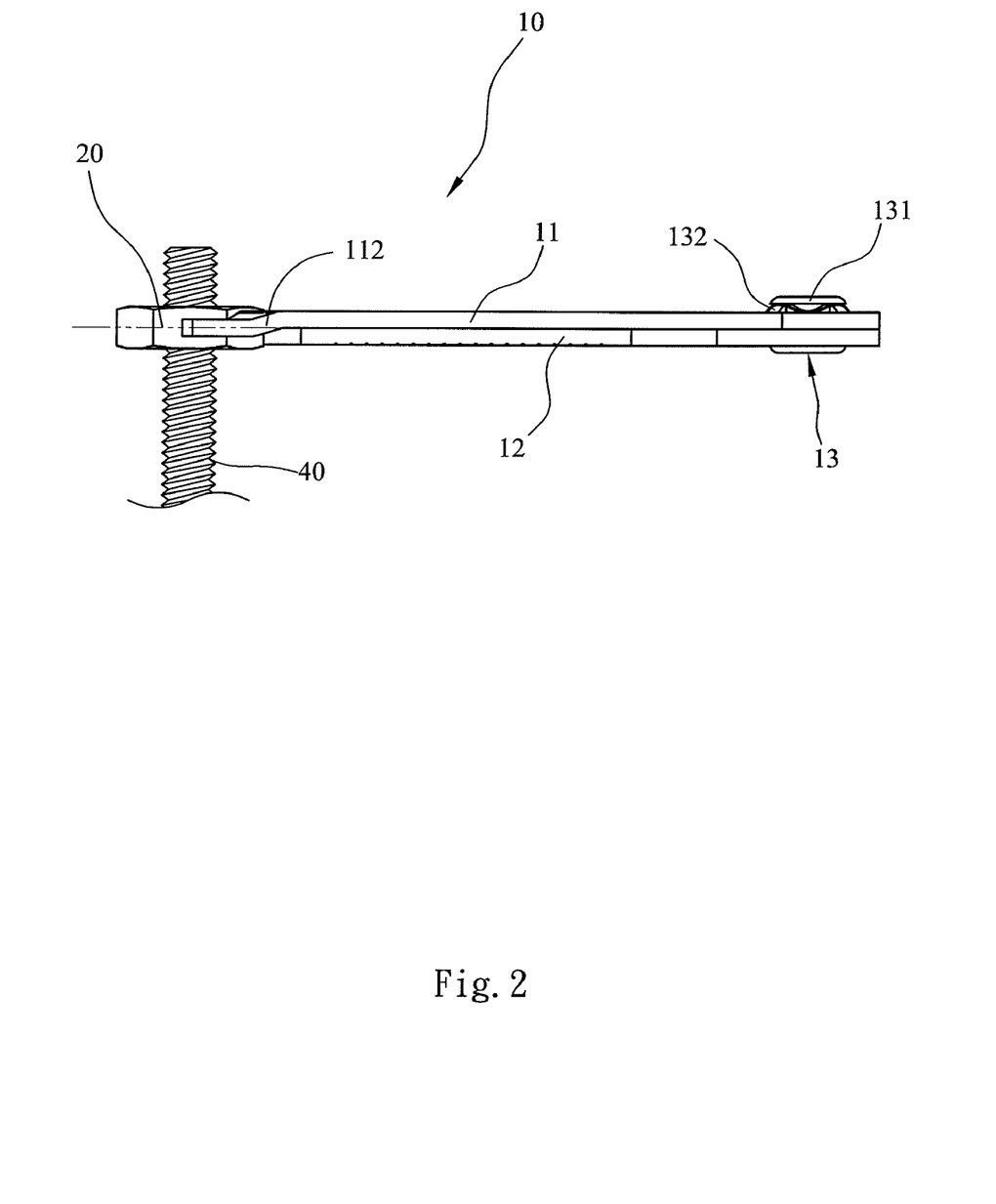
FIG. 2 shows a side view of the object and the caliper of FIG. 1 with the object in the form of a nut and engaged on a screw.
Figure 3:
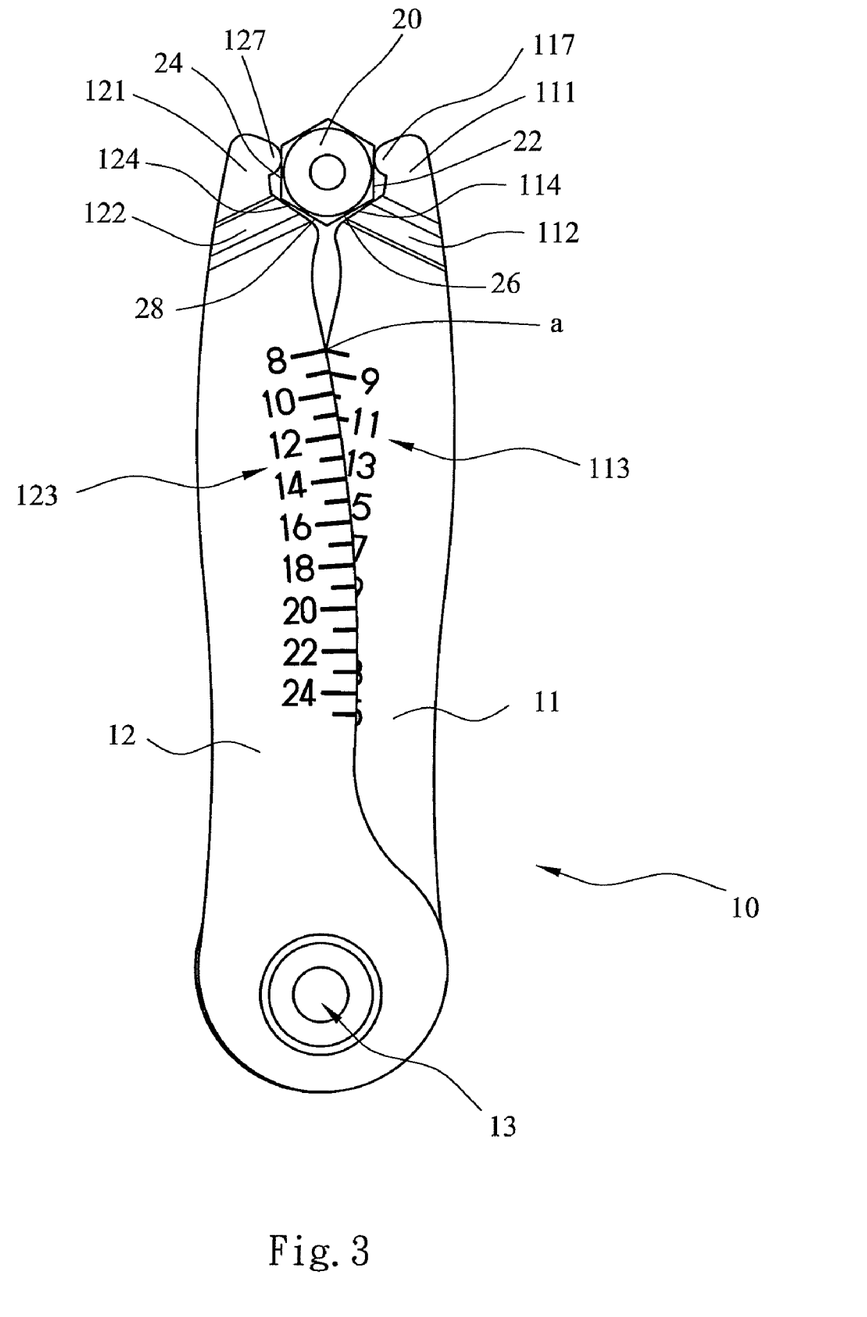
FIG. 3 shows a front elevational view illustrating use of the caliper of FIG. 1 for gauging an object of a smaller size.
Figure 4:
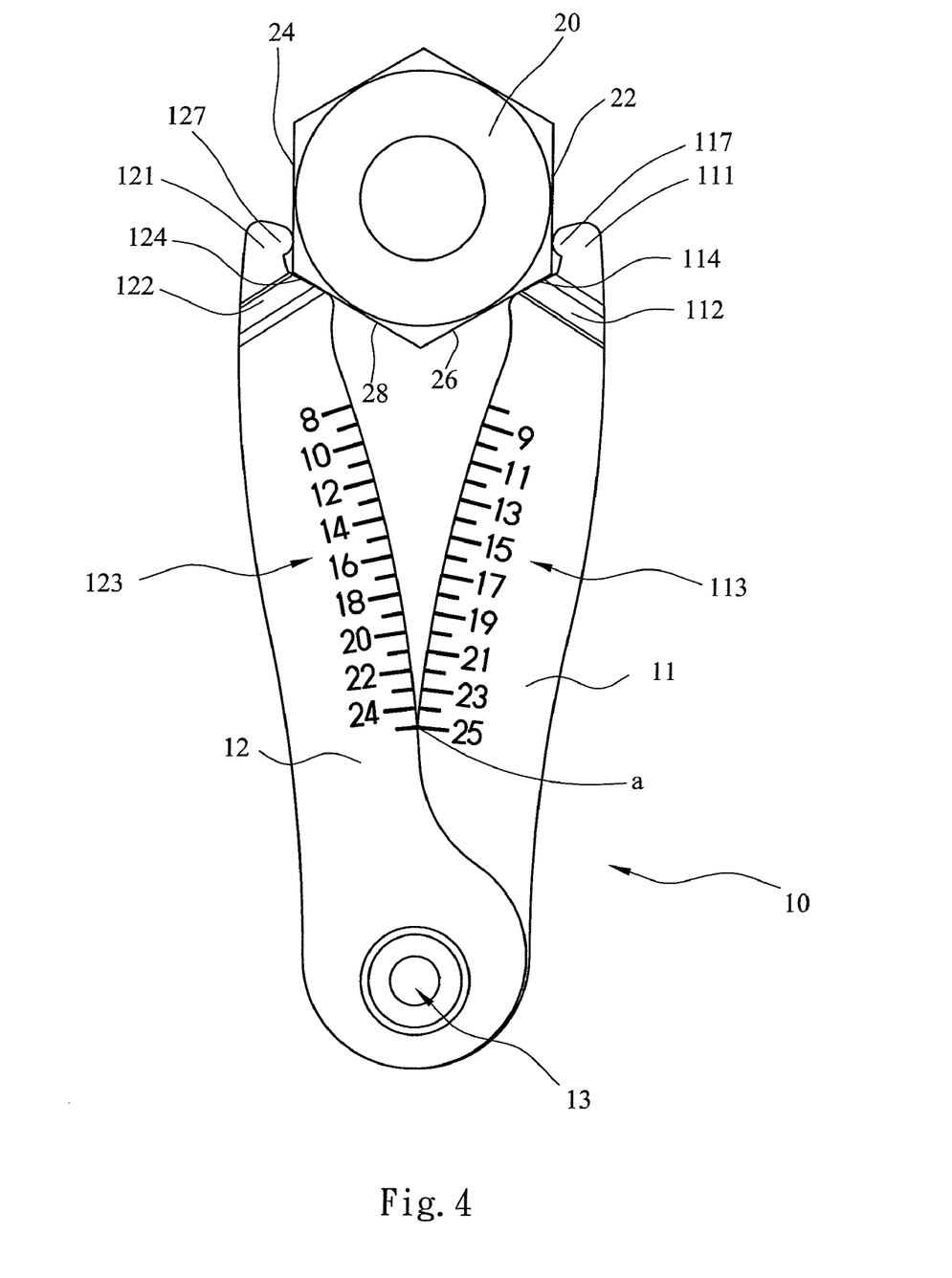
FIG. 4 shows a front elevational view illustrating use of the caliper of FIG. 1 for gauging an object of a larger size.
Figure 5:
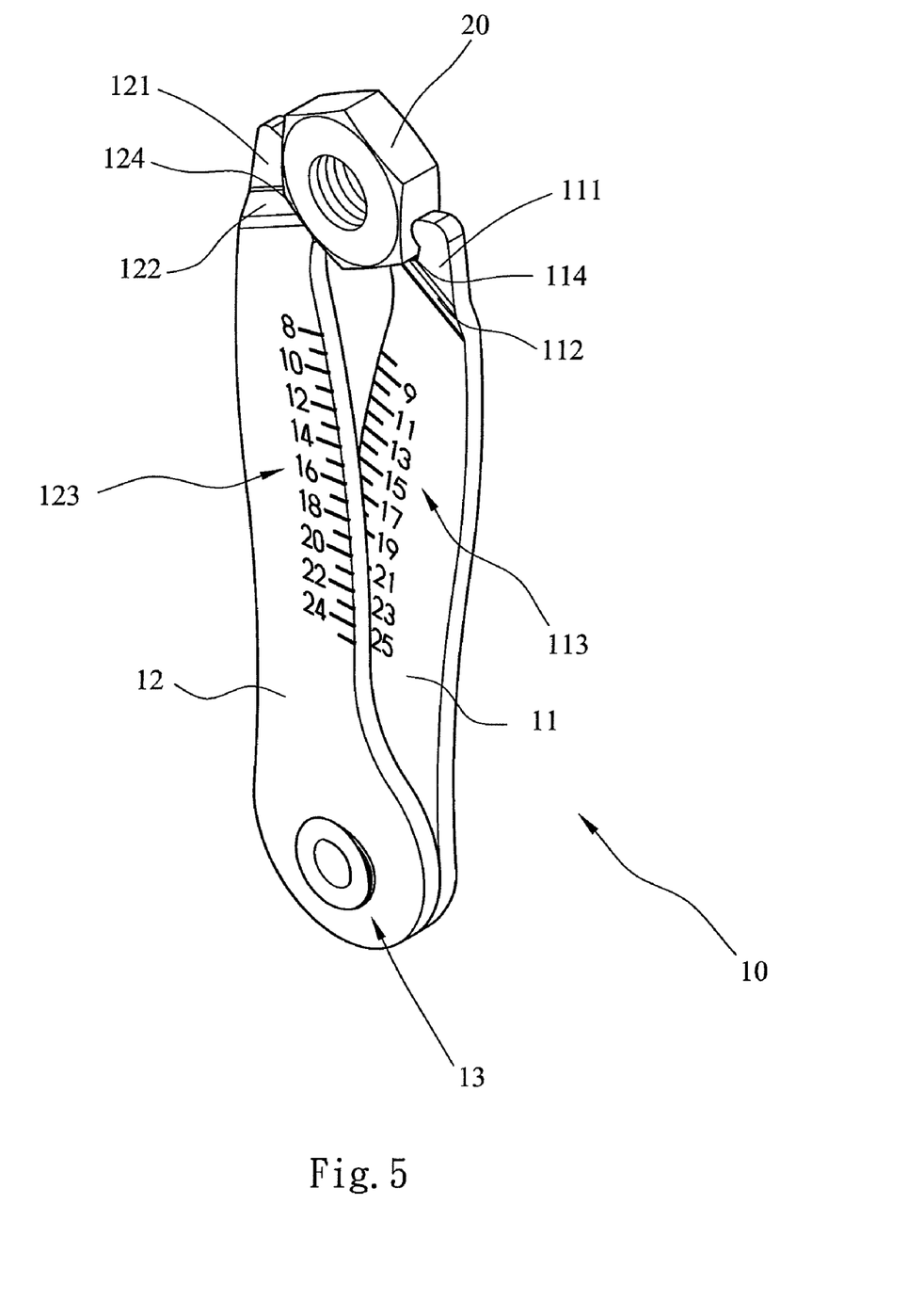
FIG. 5 shows a perspective view of the object and the caliper of FIG. 1.
Figure 6:
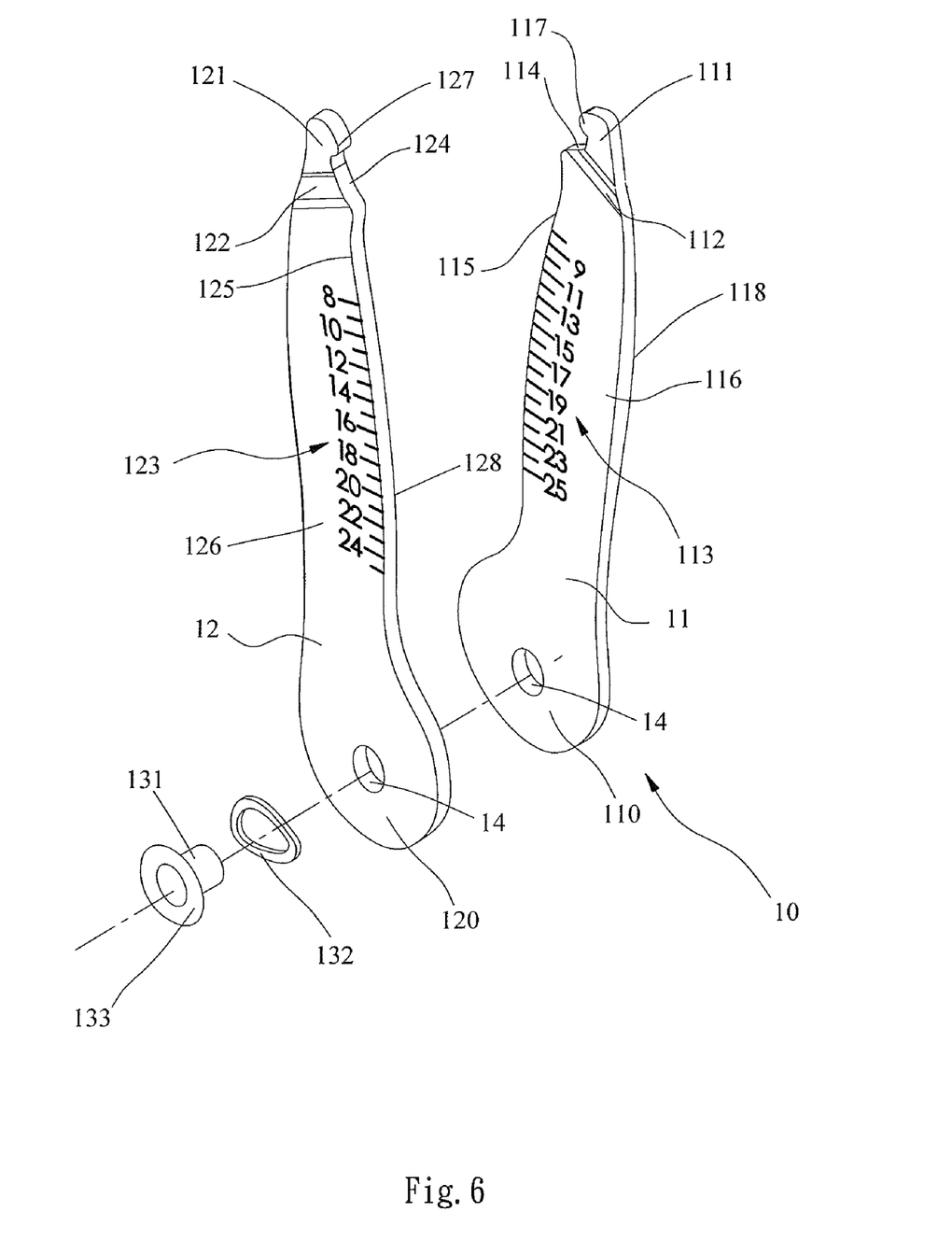
FIG. 6 shows an exploded, perspective view of the caliper of FIG. 1.

Now that the basic construction of caliper 10 of the preferred teachings of the present invention has been explained, the operation and some of the advantages of caliper 10 can be set forth and appreciated. When measuring a size of an object 20 such as a nut, bolt head, or the like, first and second legs 11 and 12 are pivoted toward each other until protrusions 117 and 127 abut two opposite sides 22 and 24 of object 20. Inclined surfaces 114 and 124 of first and second legs 11 and 12 abut another two sides 28 and 26 of object 20 intermediate opposite sides of object 20. The size of object 20 is indicated by an intersection a of scales 113 and 123 or of scales 119 and 129, depending on the measuring unit to be utilized for gauging object 20. Thus, object 20 of differing sizes can be rapidly gauged by caliper 10 according to the preferred teachings of the present invention. Note that object 20 can be gauged on site, which is convenient to the operator. As an example, object 20 in the form of a nut can be gauged while it is threadedly engaged with a screw 40 (FIG. 2).

Since the sides 26 and 28 of object 20 abut and are, thus, supported by inclined surfaces 114 and 124 of first and second legs 11 and 12 of caliper 10 according to the preferred teachings of the present invention, the gauging result is reliable. Operation of caliper 10 according to the preferred teachings of the present invention is easy, and the size of object 20 can easily and rapidly be gauged.

Figure 7:
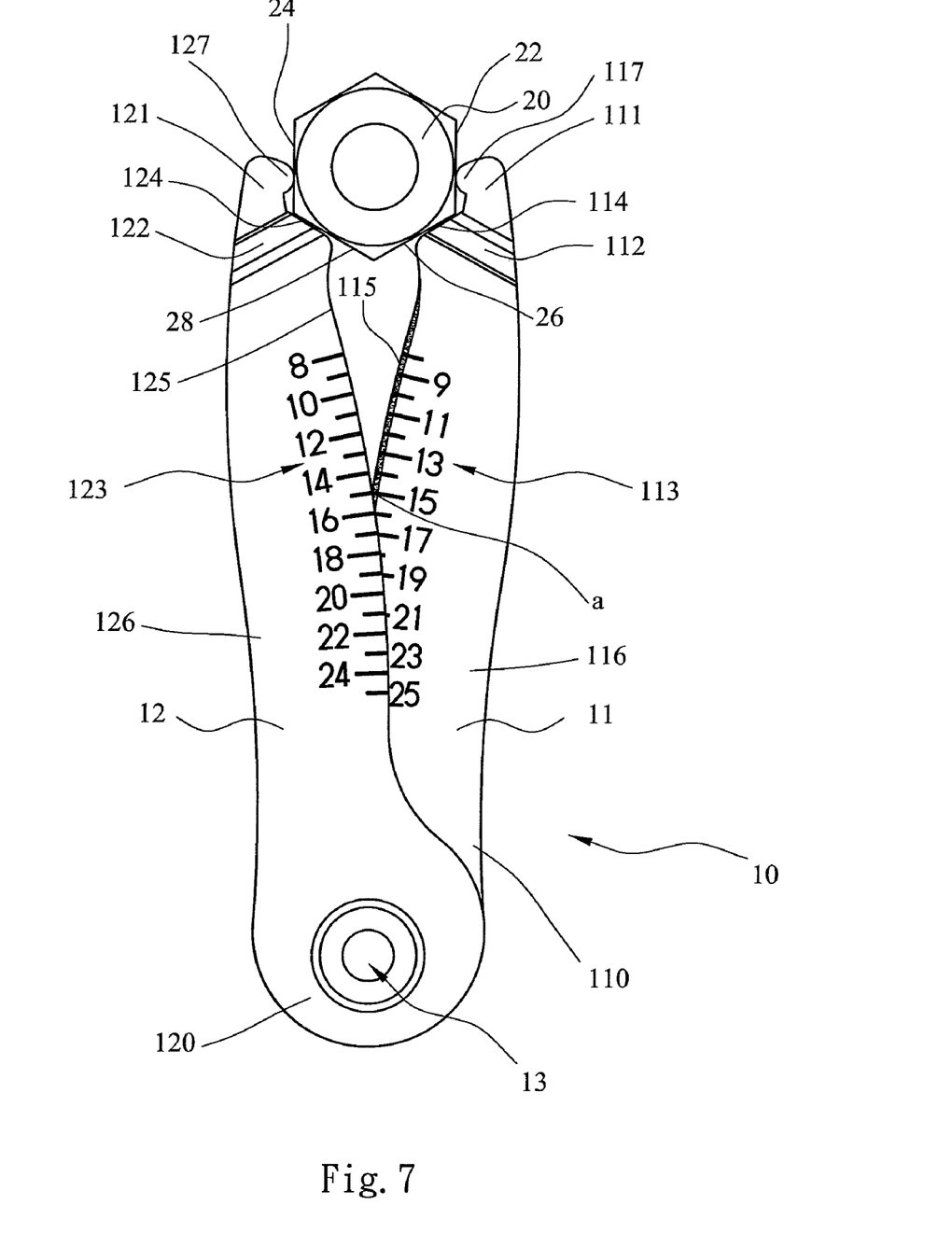
FIG. 7 shows a front elevational view of a caliper of another embodiment according to the preferred teachings of the present invention and an object being gauged by the caliper.
Figure 8:
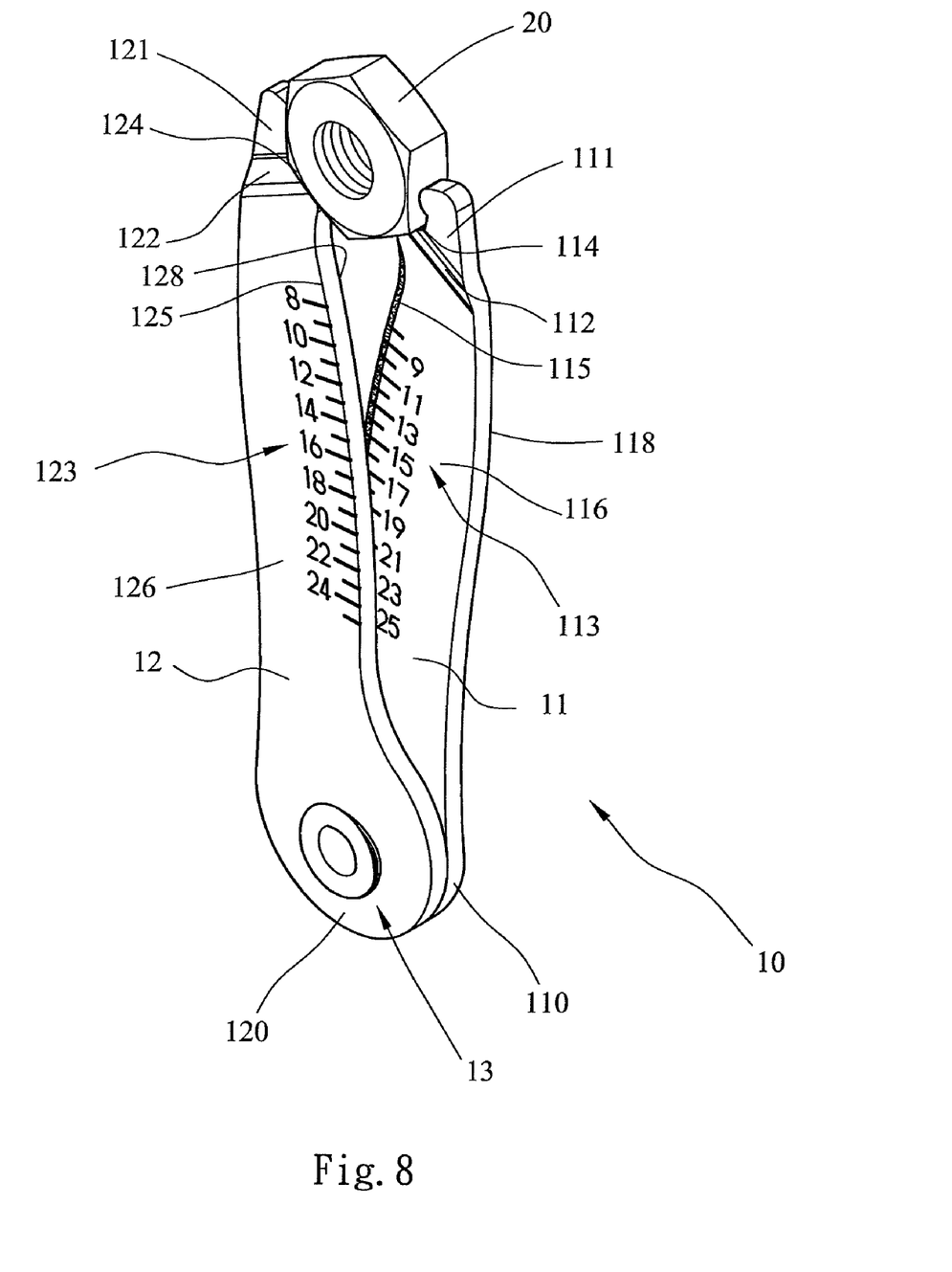
FIG. 8 shows a perspective view of the object and the caliper of FIG. 7.
Figure 9:
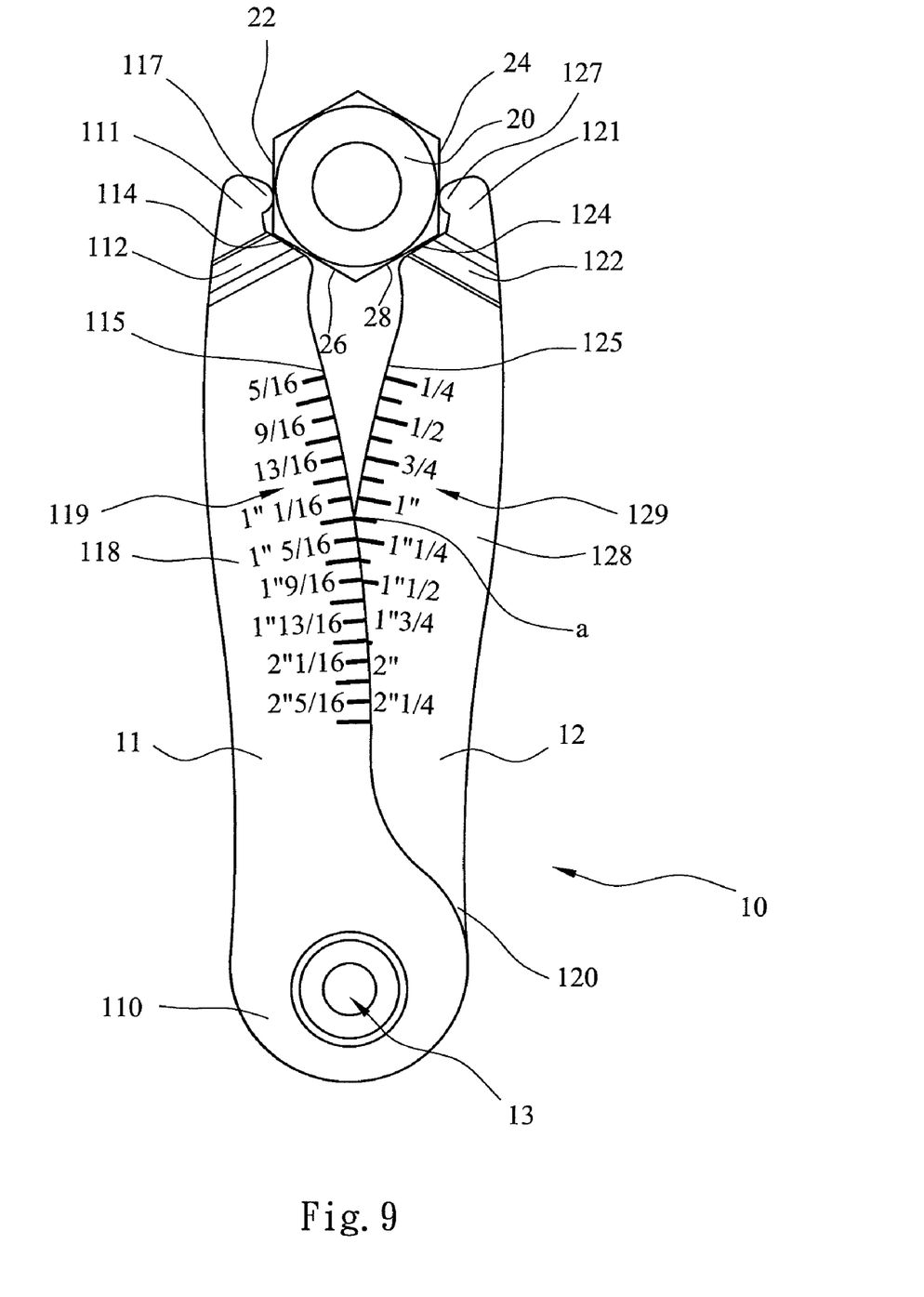
FIG. 9 shows a rear elevational view of the object and the caliper of FIG. 1.

In the preferred forms shown in FIGS. 7 and 8, inner edge 115 of first leg 11 having a different color from first face 116 of first leg 11 allows easy reading of the size of object 20 indicated by intersection a.

First and second legs 11 and 12 can be easily manufactured through simple processing. Thus, the costs for material and processing of caliper 10 according to the preferred teachings of the present invention can be significantly reduced while allowing easy operation.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A caliper comprising, in combination:

a first leg including first and second ends spaced along a first longitudinal axis, with the first leg further including first and second faces extending between the first and second ends of the first leg, with the first and second faces spaced from each other in a thickness direction perpendicular to the first longitudinal axis, with the first face of the first leg including a first scale intermediate the first and second ends of the first leg along the first longitudinal axis, with the first leg further including a first inclined surface extending between the first and second faces of the first leg in the thickness direction, with the first inclined surface at a first acute angle with the first longitudinal axis, with the first inclined surface intermediate the second end of the first leg and the first scale along the first longitudinal axis; and a second leg including first and second ends spaced along a second longitudinal axis perpendicular to the thickness direction, with the first end of the second leg pivotably connected to the first end of the first leg, with the second leg further including first and second faces extending between the first and second ends of the second leg, with the first and second faces of the second leg spaced from each other in the thickness direction, with the first face of the second leg including a second scale intermediate the first and second ends of the second leg along the second longitudinal axis, with the second leg further including a second inclined surface extending between the first and second faces of the second leg, with the second inclined surface at a second acute angle with the second longitudinal axis, with the second inclined surface intermediate the second end of the second leg and the second scale along the second longitudinal axis, with the second ends of the first and second legs being adapted to abut first and second sides of an object to be gauged by the caliper, with the first and second sides opposite to each other, with the object further including third and fourth sides intermediate the first and second sides, with the first and second inclined surfaces of the first and second legs adapted to abut the third and fourth sides of the object, with a size of the object indicated by an intersection of the first and second scales, with the second end of each of the first and second legs including a protrusion, with the protrusions of the first and second legs spaced from each other and abutting the first and second sides of the object, with the first leg including a first bend intermediate the second end of the first leg and the first scale along the first longitudinal axis, with the second leg including a second bend intermediate the second end of the second leg and the second scale along the second longitudinal axis, and with the first and second bends being so configured that the protrusions are spaced from and substantially parallel to each other.

2. The caliper as claimed in claim 1, with the first acute angle equal to the second acute angle, and with the protrusion of the first leg being of a shape symmetric to the protrusion of the second leg.

3. The caliper as claimed in claim 1, with the first end of each of the first and second legs having a pivot hole, with the caliper further comprising, in combination: a rivet extending through the pivot holes and having an enlarged section; and a wave-shaped washer mounted around the rivet and sandwiched between the enlarged section and one of the first ends of the first and second legs.

4. The caliper as claimed in claim 1, further comprising, in combination:
a third scale formed on the second face of the first leg; and
a fourth scale formed on the second face of the second leg, with the first scale having a measuring unit the same as that of the second scale, with the third scale having a measuring unit the same as that of the fourth scale but different from that of the first scale, with the size of the object being indicated by an intersection of the third and fourth scales.

5. A caliper comprising, in combination:
a first leg including first and second ends spaced along a first longitudinal axis, with the first leg further including first and second faces extending between the first and second ends of the first leg, with the first and second faces spaced from each other in a thickness direction perpendicular to the first longitudinal axis, with the first face of the first leg including a first scale intermediate the first and second ends of the first leg along the first longitudinal axis, with the first leg further including a first inclined surface extending between the first and second faces of the first leg in the thickness direction, with the first inclined surface at a first acute angle with the first longitudinal axis, with the first inclined surface intermediate the second end of the first leg and the first scale along the first longitudinal axis; and a second leg including first and second ends spaced along a second longitudinal axis perpendicular to the thickness direction, with the first end of the second leg pivotably connected to the first end of the first leg, with the second leg further including first and second faces extending between the first and second ends of the second leg, with the first and second faces of the second leg spaced from each other in the thickness direction, with the first face of the second leg including a second scale intermediate the first and second ends of the second leg along the second longitudinal axis, with the second leg further including a second inclined surface extending between the first and second faces of the second leg, with the second inclined surface at a second acute angle with the second longitudinal axis, with the second inclined surface intermediate the second end of the second leg and the second scale along the second longitudinal axis, with the second ends of the first and second legs being adapted to abut first and second sides of an object to be gauged by the caliper, with the first and second sides opposite to each other, with the object further including third and fourth sides intermediate the first and second sides, with the first and second inclined surfaces of the first and second legs adapted to abut the third and fourth sides of the object, with a size of the object indicated by an intersection of the first and second scales, with the first face of the first leg having a first inner edge on which the first scale is formed, with the first face of the second leg having a second inner edge on which the second scale is formed, and with the first inner edge having a color different from that of the first face of the first leg.

6. The caliper as claimed in claim 5, with the first end of each of the first and second legs having a pivot hole, with the caliper further comprising, in combination: a rivet extending through the pivot holes and having an enlarged section; and a wave-shaped washer mounted around the rivet and sandwiched between the enlarged section and one of the first ends of the first and second legs.

7. The caliper as claimed in claim 5, further comprising, in combination:
a third scale formed on the second face of the first leg; and
a fourth scale formed on the second face of the second leg, with the first scale having a measuring unit the same as that of the second scale, with the third scale having a measuring unit the same as that of the fourth scale but different from that of the first scale, with the size of the object being indicated by an intersection of the third and fourth scales.

* * * * *